US009262724B2

(12) United States Patent
Kingsbury et al.

(10) Patent No.: US 9,262,724 B2
(45) Date of Patent: Feb. 16, 2016

(54) LOW-RANK MATRIX FACTORIZATION FOR DEEP BELIEF NETWORK TRAINING WITH HIGH-DIMENSIONAL OUTPUT TARGETS

(71) Applicant: International Business Machines Corporation, Armonk, NY (US)

(72) Inventors: Brian E. D. Kingsbury, Cortlandt Manor, NY (US); Tara N. Sainath, New York, NY (US); Vikas Sindhwani, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/927,192

(22) Filed: Jun. 26, 2013

(65) Prior Publication Data

US 2014/0019388 A1 Jan. 16, 2014

Related U.S. Application Data

(60) Provisional application No. 61/671,273, filed on Jul. 13, 2012.

(51) Int. Cl.
*G06N 99/00* (2010.01)
(52) U.S. Cl.
CPC .................. *G06N 99/005* (2013.01)
(58) Field of Classification Search
CPC .................................................. G06N 99/005
See application file for complete search history.

(56) References Cited

U.S. PATENT DOCUMENTS

2008/0072182 A1* 3/2008 He et al. ............................ 716/2
2012/0317060 A1* 12/2012 Jebara ............................ 706/21

OTHER PUBLICATIONS

Seide et al., Feature Engineering in Context-Dependent Deep Neural Networks for Conversational Speech Transcription, IEEE, 2011, pp. 24-29.*
E. Arisoy et al., "Deep Neural Network Language Models," Proceedings of the NAACL-HLT 2012 Workshop: Will We Ever Really Replace the N-gram Model? On the Future of Language Modeling for HLT, Jun. 8, 2012, pp. 20-28, Montreal, Canada.
H. Bourlard et al., "Connectionist Speech Recognition: A Hybrid Approach," 1994, 291 pages, Kluwer Academic Publishers.
S. Chen, "Performance Prediction for Exponential Language Models," Proceedings of Human Language Technologies: The 2009 Annual Conference of the North American Chapter of the ACL, Jun. 2009, pp. 450-458, Boulder, Colorado.
G.E. Dahl et al., "Phone Recognition with the Mean-Covariance Restricted Boltzmann Machine," Advances in Neural Information Processing Systems 23: 24th Annual Conference on Neural Information Processing Systems 2010, Dec. 2010, pp. 469-477.
G. Hinton, "To Recognize Shapes, First Learn to Generate Images," Progress in Brain Research, 2007, pp. 535-547, vol. 165.

(Continued)

*Primary Examiner* — Alan Chen
(74) *Attorney, Agent, or Firm* — Anne V. Dougherty; Ryan, Mason & Lewis, LLP (57) ABSTRACT

Systems and methods for reducing a number of training parameters in a deep belief network (DBN) are provided. A method for reducing a number of training parameters in a deep belief network (DBN) comprises determining a network architecture including a plurality of layers, using matrix factorization to represent a weight matrix of a final layer of the plurality of layers as a plurality of matrices, and training the DBN having the plurality of matrices.

20 Claims, 4 Drawing Sheets

(56) References Cited

OTHER PUBLICATIONS

G. Hinton, "Deep Belief Networks," available at www.scholarpedia.org/article/Deep_belief_networks?pagewanted=all, last accessed on Nov. 1, 2013, 4 pages.

B. Kingsbury et al., "Lattice-Based Optimization of Sequence Classification Criteria for Neural-Network Acoustic Modeling," IEEE International Conference on Acoustics, Speech and Signal Processing (ICASSP), Apr. 2009, pp. 3761-3764.

B. Kingsbury et al., "Scalable Minimum Bayes Risk Training of Deep Neural Network Acoustic Models Using Distributed Hessian-Free Optimization," Proceedings of the 13th Annual Conference of the International Speech Communication Association (INTERSPEECH 2012), pp. 10-13.

Y. Lecun et al., "Convolutional Networks for Images, Speech, and Time-Series," The Handbook of Brain Theory and Neural Networks, 1995, 14 pages.

T.N. Sainath et al., "Deep Convolutional Neural Networks for LVCSR," CoRR abs/1309.1501, May 2013, 5 pages.

T.N. Sainath et al., "Making Deep Belief Networks Effective for Large Vocabulary Continuous Speech Recognition," Proceedings of the 2011 IEEE Workshop on Automatic Speech Recognition and Understanding (ASRU), Dec. 2011, 6 pages.

F. Seide et al., "Conversational Speech Transcription Using Context-Dependenet Deep Neural Networks," INTERSPEECH—2011, pp. 437-440.

H. Soltau et al., "The IBM Attila Speech Recognition Toolkit," 2010 IEEE Spoken Language Technology Workshop (STL), Dec. 2010, pp. 97-102.

B. Recht et al., "Parallel Stochastic Gradient Algorithms for Large-Scale Matrix Completion," Mathematical Programming Computation, Jun. 2013, pp. 201-226.

M. Yuan et al., "Dimension Reduction and Coefficient Estimation in Multivariate Linear Regression," Journal of the Royal Statistical Society Series, 2007, pp. 329-346, vol. 69, No. 3.

\* cited by examiner

LOW-RANK MATRIX FACTORIZATION FOR DEEP BELIEF NETWORK TRAINING WITH HIGH-DIMENSIONAL OUTPUT TARGETS

CROSS-REFERENCE TO RELATED APPLICATION

This application claims the benefit of U.S. Provisional Patent Application Ser. No. 61/671,273, filed on Jul. 13, 2012, the contents of which are herein incorporated by reference in their entirety.

This invention was made with Government support under Contract No. D11PC20192 awarded by Defense Advanced Research Projects Agency (DARPA). The government has certain rights in this invention.

TECHNICAL FIELD

The field generally relates to systems and methods for reducing the number of parameters of a Deep Belief Network and, in particular, to systems and methods for reducing the number of parameters of a Deep Belief Network using a low-rank matrix factorization of the final weight layer.

BACKGROUND

Deep Belief Networks (DBNs) have become popular in the speech community over the last few years and have achieved success, showing significant gains over state-of-the-art Gaussian Mixture Model (GMM)/Hidden Markov Model (HMM) systems on a wide variety of small and large vocabulary tasks, such as, for example, large vocabulary continuous speech recognition (LVCSR) tasks. However, an issue with DBNs is that training is slow, in part because DBNs can have a much larger number of parameters (e.g., 10-50 million) compared to GMMs. Because networks are trained with a large number of output targets to achieve good performance, the majority of these parameters are in the final weight layer.

There have been some attempts in the speech recognition community to reduce the number of parameters in the DBN without significantly increasing final recognition accuracy. One common approach, known as "sparsification", is to zero out weights which are close to zero. However, this reduces parameters after the network architecture has been defined and therefore does not have any impact on training time. Second, convolutional neural networks (CNNs) have also been explored to reduce parameters of the network, by sharing weights across both time and frequency dimensions of the speech signal. However, experiments show that in speech recognition, the best performance with CNNs can be achieved when matching the number of parameters to a DBN, and therefore parameter reduction with CNNs does not always hold in speech tasks.

Accordingly, there is a need for methods and systems for parameter reduction that can reduce training time while preserving final recognition accuracy.

SUMMARY

In general, exemplary embodiments of the invention include systems and methods for reducing the number of parameters of a Deep Belief Network and, in particular, to systems and methods for reducing the number of parameters of a Deep Belief Network using a low-rank matrix factorization of the final weight layer.

According to an exemplary embodiment of the present invention, a system for reducing a number of training parameters in a deep belief network (DBN), comprises an architecture setup module capable of determining a network architecture including a plurality of layers, a factorization module capable of using matrix factorization to represent a weight matrix of a final layer of the plurality of layers as a plurality of matrices, and a training module capable of training the DBN having the plurality of matrices.

According to an exemplary embodiment of the present invention, an article of manufacture comprises a computer readable storage medium comprising program code tangibly embodied thereon, which when executed by a computer, performs method steps for reducing a number of training parameters in a deep belief network (DBN), the method steps comprising determining a network architecture including a plurality of layers, using matrix factorization to represent a weight matrix of a final layer of the plurality of layers as a plurality of matrices, and training the DBN having the plurality of matrices.

According to an exemplary embodiment of the present invention, a method for reducing a number of training parameters in a deep belief network (DBN) comprises determining a network architecture including a plurality of layers, using matrix factorization to represent a weight matrix of a final layer of the plurality of layers as a plurality of matrices, and training the DBN having the plurality of matrices.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for reducing the number of parameters of a Deep Belief Network and, in particular, to systems and methods for reducing the number of parameters of a Deep Belief Network using a low-rank matrix factorization of the final weight layer. This invention may, however, be embodied in many different forms and should not be construed as limited to the embodiments set forth herein.

Embodiments of the present invention provide a system and method for reducing the number of parameters of a DBN using a low-rank matrix factorization of the final weight layer. The low-rank technique in accordance with embodiments of the present invention can be applied to DBNs for both acoustic modeling and language modeling. Experimental results of embodiments of the present invention, described further below, show on three different LVCSR tasks ranging between 50-400 hrs, that a low-rank factorization reduces the number of parameters of the network by 30-50%. This results in roughly an equivalent reduction in training time, without a significant loss in final recognition accuracy, compared to a full-rank representation.

In accordance with embodiments of the present invention, a reduction of parameters of the DBN before training is achieved, such that overall training time is reduced, but recognition accuracy is not significantly decreased. In speech, for example, DBNs are trained with a large number of output targets (e.g., 2,000-10,000), equal to the number of context-dependent states of a GMM/HMM system, to achieve good recognition performance. Having a larger number of output targets contributes significantly to the large number of parameters in the system, as over 50% of parameters in the network can be contained in the final layer. Furthermore, few output targets are actually active for a given input. Embodiments of the present invention hypothesize that the output targets that are active are probably correlated (i.e., correspond to a set of confusable context-dependent HMM states). The last weight layer in the DBN is used to project the final hidden representation to these output targets. Because few output targets are active, embodiments of the present invention conclude that the last weight layer (i.e., matrix) is low-rank, use factorization to represent this matrix by two smaller matrices, thereby significantly reducing the number of parameters in the network before training. Another benefit of low-rank factorization for non-convex objective functions, such as those used in DBN training, is that low-rank factorization constrains the space of search directions that can be explored to maximize the objective function. As a result, optimization is made more efficient and the number of training iterations is reduced, particularly for second-order optimization techniques.

Embodiments of the present invention explore low-rank factorization specifically for DBN training, which reduces the overall number of network parameters and improves training speed. Experiments were conducted on a 50-hour English Broadcast News (BN) task, where a DBN was trained with 2,220 output targets. As described in further detail below, in accordance with an embodiment of the present invention, by imposing a rank of 128 on the final matrix, the number of parameters of the DBN can be reduced by 28% with no loss in accuracy. Furthermore, when low-rank matrices are used with $2^{nd}$ order Hessian-free sequence-training, the overall number of training iterations can be reduced by about 40%, leading to further training speed improvements. Embodiments of the present invention also explore the behavior of low-rank factorization on two larger tasks with larger number of output targets: namely a 300-hour Switch-board (SWB) task with 9,300 output targets and a 400-hour English BN task with 6,000 output targets. With BN, the experiments illustrate a reduction in the number of parameters of the network by 49% with no loss in accuracy, and for SWB by 32%, with nearly no loss in accuracy.

It is to be understood that embodiments of the present invention can be extended to use low-rank factorization beyond acoustic modeling, exploring the versatility of the low-rank technique on DBNs used for language modeling (DBN-LM). For example, experimental results of embodiments of the present invention show that with low-rank factorization, the number of parameters of a DBN-LM trained with 10,000 output targets can be reduced by 45% without a significant loss in accuracy.

LOW-RANK MATRIX FACTORIZATION

Figure 1:
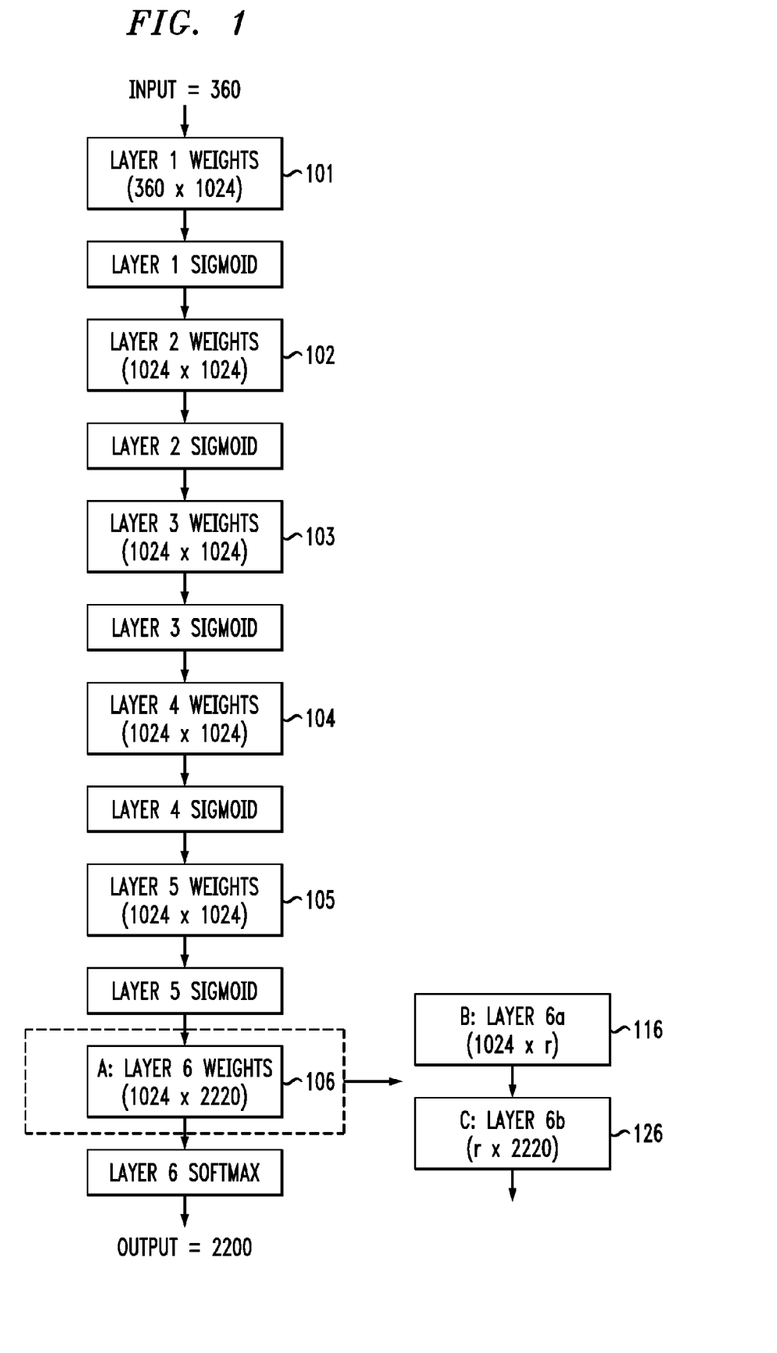
FIG. 1 shows a neural network architecture for speech recognition problems and replacement of a weight matrix in a final weight by two matrices according to an exemplary embodiment of the invention.

The left-hand side of FIG. 1 shows a neural network architecture for speech recognition problems, specifically, 5 hidden layers 101, 102, 103, 104, and 105 with 1,024 hidden units per layer, and a softmax layer with 2,220 output targets. Input=360 as shown in FIG. 1 represents the input feature dimension of size 40, using a context of 9 frames, giving 360 dimensions. In accordance with embodiments of the present invention, the last weight matrix in layer 6 106 is represented by a low-rank matrix. Specifically, the layer 6 weight is denoted by A, which has the dimension m×n. If A has rank r, then there exists a factorization A=B×C where B is a full-rank matrix of size m×r and C is a full-rank matrix of size r×n. Thus, the matrix A is replaced by matrices B and C 116 and 126. There is no non-linearity (i.e., sigmoid) between matrices B and C.

The right-hand side of FIG. 1 illustrates replacing the weight matrix in layer 6, by two matrices 116 and 126, one of size 1,024×r and one of size r×2,220. The number of parameters of the system can be reduced as long as the number of parameters in B (i.e., mr) and C (i.e., rn) is less than those in A (i.e., mn). If we would like to reduce the number of parameters in A by a fraction p, we require the following to hold.

$$mr+rn<pmn \qquad (1)$$

Solving for r in Equation 1 gives the following requirement needed to reduce overall parameters by fraction p.

$$r < \frac{pmn}{m+n} \qquad (2)$$

In accordance with embodiments of the present invention, the choice of r can be task specific, and can depend on, for example, the desired amount of reduction in the number of network parameters, and acceptable error-rate limits.

LOW-RANK ANALYSIS

Experimental Example 1

Experiments utilizing the methods of the embodiments of the present invention were conducted on a 50 hour English Broadcast News (BN) transcription task (see B. Kingsbury, "Lattice-Based Optimization of Sequence Classification Criteria for Neural-Network Acoustic Modeling," in Proc. ICASSP, 2009), and results are reported on 100 speakers in the EARS dev04f set. The initial acoustic features are 13-dimensional Mel Frequency Cepstral Coefficent (MFCC) features. An LVCSR recipe, described in H. Soltau, G. Saon, and B. Kingsbury, "The IBM Attila speech recognition tool kit," in Proc. IEEE Workshop on Spoken Language Technology, 2010, pp. 97-102, was used to create a set of feature-space speaker-adapted (FSA) features, using vocal-tract length normalization (VTLN) and feature-space maximum likelihood linear regression (fMLLR).

In this example, all DBNs use FSA features as input, with a context of 9 frames around the current frame, and a 5-layer DBN with 1,024 hidden units per layer and a sixth softmax layer with 2,220 output targets is the architecture used for the BN tasks. All DBNs are pre-trained generatively using the procedure outlined in T. N. Sainath, B. Kingsbury, B. Ramabhadran, P. Fousek, P. Novak, and A. Mohamed, "Making Deep Belief Networks Effective for Large Vocabulary Continuous Speech Recognition," in Proc. ASRU, 2011. During fine-tuning, the DBN is first trained using the cross-entropy (CE) objective function. With this criterion, after one pass through the data, loss is measured on a held-out set (this held-out set is different than dev04f) and the learning rate is annealed (i.e., reduced) by a factor of 2 if the held-out loss has grown from the previous iteration. Training stops after the weights have been annealed 5 times. After CE training, Hessian-free sequence-training is performed to better adjust the weights for a sequence-level speech task.

In accordance with an embodiment of the present invention, the behavior of the low-rank network, and the appropriate choice of r for a cross-entropy trained DBN is explored. In this case, the baseline DBN system contains 6.8 million (6.8M) parameters and has a word-error-rate (WER) of 17.7% on the dev04f set. In accordance with an embodiment of the present invention, the final layer full-rank matrix 106 of size 1,024×2,220 is replaced with two matrices 116 and 126, one of size 1,024×r and one of size r×2,220. Table 1 shows the WER for different choices of the rank r and the corresponding percentage reduction in parameters compared to the baseline DBN system. The number of parameters are represented in the millions (M).

TABLE 1

| r = Rank | WER | # of Params (% Reduction) |
| --- | --- | --- |
| Full Rank | 17.7 | 6.8M |
| 512 | 17.3 | 6.2M (10%) |
| 256 | 17.6 | 5.4M (20%) |
| 128 | 17.7 | 5.0M (28%) |
| 64 | 18.0 | 4.8M (30%) |
| 32 | 18.3 | 4.7M (31%) |

Figure 2:
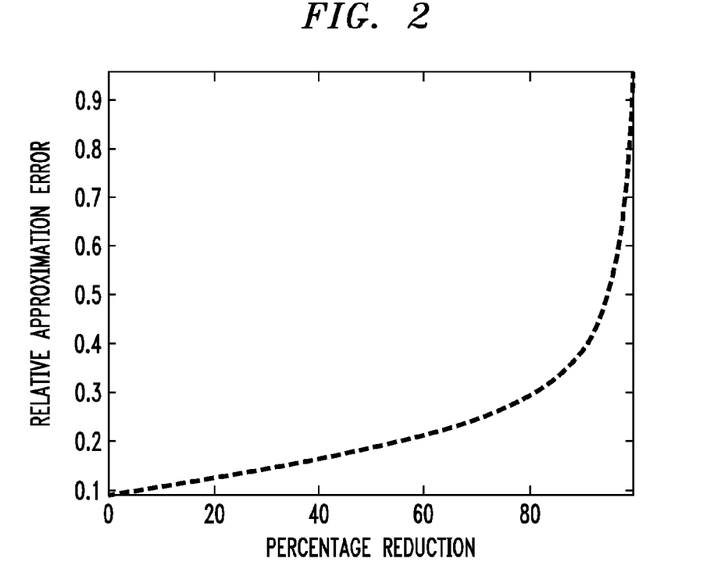
FIG. 2 plots the relative spectral norm error between the final layer full-rank matrix and its best rank-r approximation, as a function of percentage of parameters reduced by using a rank-r matrix, according to an exemplary embodiment of the invention.

FIG. 2 plots the relative spectral norm error between the final layer full-rank matrix and its best rank-r approximation, as a function of percentage of parameters reduced by using a rank-r matrix. The figure shows that between 0 to 30%, the increase in relative spectral norm error is not large, approximately 0.05. In addition, Table 1 shows that with a 28% reduction in parameters (i.e., r=128), the softmax outputs are not significantly affected and the same WER of 17.7% as the baseline system can be achieved. Accordingly, if a rank of 128 is selected, the number of parameters can be reduced without changing the WER from the baseline system. In accordance with an embodiment of the present invention, the rank r is chosen to achieve a maximum reduction in parameters while still achieving a WER comparable to a non low-rank DBN.

Figure 3:
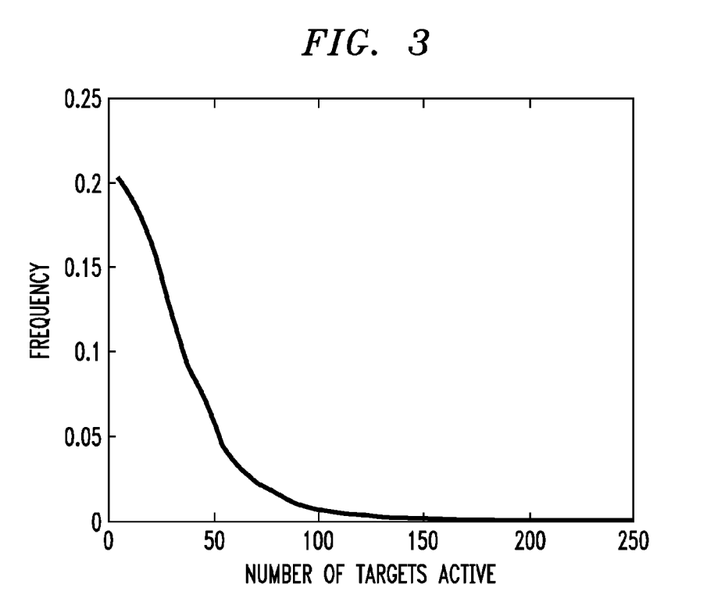
FIG. 3 plots a histogram of the number of active output targets for 50 utterances in the dev04f set according to an exemplary embodiment of the present invention.

In order to determine or to confirm a rank selection (in this case 128), according to an embodiment of the invention, it is determined how many of the total of the output targets of the full-rank matrix are above a threshold to be termed "active". In this case, it was determined how many of the 2,220 output targets of the full-rank matrix were above a threshold of 1e-03, and, therefore, "active". FIG. 3 plots a histogram of the number of active output targets for 50 utterances in the dev04f set. As can be seen, typically 128 or less output targets are active, confirming that a rank of 128 was appropriate for the Broadcast News task.

Because the low-rank network has an extra weight multiplication compared to the full-rank system, embodiments of the present invention also confirm whether the reduction in parameters with the low-rank method improves overall DBN training speed compared to the full-rank system. By way of example, timing experiments can be run on an 8 core INTEL XEON X5570@2.93 GHz CPU. Matrix/vector operations for DBN training are multi-threaded using INTEL MKL-BLAS. The results of the experiment revealed that the full-rank system takes approximately 41 hours to train, while the low-rank system takes about 33 hours to train, about a 20% speedup in over-all training when using the low-rank system. Training may be performed using, for example, fine-tuning and backpropagation algorithms.

It was not found that the overall number of training iterations is reduced when using a low-rank versus full-rank approximation. One possible reason for this is that mini-batch stochastic gradient descent (SGD) already helps to constrain search space as search directions are computed frequently from small batches, and therefore low-rank factorization does not help to further improve the optimization.

Because sequence-training is often applied after cross-entropy training, embodiments of the present invention can also include low-rank factorization for sequence training. Given that r=128 was the best architecture for cross-entropy training in this case, this architecture was also kept for sequence training in the experimental example. Table 2 shows the performance after sequence-training for the low-rank and full-rank networks.

TABLE 2

| Method | WER | # Iters | Training Time (hrs) |
| --- | --- | --- | --- |
| Full Rank | 14.7 | 24 | 18.7 |
| Low Rank (r = 128) | 14.7 | 14 | 8.4 |

The WER of both systems is the same, indicating that low-rank factorization does not adversely affect DBN performance during sequence training. In addition, the number of iterations for the low-rank system is significantly reduced compared to the full-rank system. With a second-order Hessian-free technique, the introduction of low-rank factorization helps to further constrain the space of search directions and makes the optimization more efficient. This leads to an overall sequence training time of 8.3 hours, a 55% speedup in training time compared to the full-rank system with a training time of 18.7 hours.

Embodiments of the present invention check to see whether network parameters can be further reduced by applying the low-rank methodology to other layers. For this experiment, the low-rank factorization was applied to the final hidden layer 105, which has a dimension 1,024×1,024. Table 3 shows the WER and number of parameters for different rank choices of the hidden layer matrix.

TABLE 3

| r = Rank | WER | Number of Params (% Reduction) |
| --- | --- | --- |
| Baseline | 17.7 | 5.0M |
| 256 | 18.0 | 4.5M (11%) |
| 128 | 18.1 | 4.2M (16%) |

Referring to Table 3, the baseline system has a low-rank of 128 applied on the final softmax layer, but no other factorization. The reduction in parameters with low-rank is smaller compared to Table 1 because the softmax weight layer is larger than the hidden weight layer. Notice that the WER goes up when rank factorization is used. This indicates that while the softmax-layer has a low-rank factorization, the hidden layers do not have the same properties as the softmax-layer.

To illustrate the applicability of the low-rank factorization of the embodiments of the present invention to larger datasets, experiments were conducted using the larger datasets, which have even larger numbers of output targets than the dataset in Experimental Example 1.

Experimental Example 2

Experimental Example 2 explores scalability of the proposed low-rank factorization on 400 hours of English Broadcast News (BN) (see B. Kingsbury, "Lattice-Based Optimization of Sequence Classification Criteria for Neural-Network Acoustic Modeling," in Proc. ICASSP, 2009). Results are reported on the DARPA EARS dev04f set. The initial acoustic features are 19-dimensional Perceptual Linear Prediction (PLP) features. As with Experimental Example 1, FSA features are created by utilizing VTLN and fMLLR speaker-adaptation techniques, and are used as input to the DBN. All DBNs use FSA features as input, with a context of 9 frames around the current frame. In this example, the architecture includes 5 hidden layers with 1,024 hidden units per layer and a sixth softmax layer with 5,999 output targets. DBN results are only reported for cross-entropy training, to demonstrate the parameter reduction with low-rank.

Table 4 shows the WER and number of parameters for both the baseline and low-rank DBNs.

TABLE 4

| Method | WER | # of Params (% Reduction) |
|---|---|---|
| Full-Rank DBN | 16.7 | 10.7M |
| Low-Rank DBN (r = 128) | 16.6 | 5.5M (49%) |

As can be seen from Table 4, parameters can be reduced by 49% without any loss in accuracy. It is further noted that training time for the full-rank DBN takes roughly 14.8 days, while training time for the low-rank DBN takes 7.7 days, about twice as fast with low-rank.

Experimental Example 3

Experimental Example 3 explores scalability of the proposed low-rank factorization on 300 hours of conversational American English telephony data from the Switchboard (SWB) corpus. Results are reported on the Hub5'00 set. As with the previous experimental examples, FSA features are created by utilizing VTLN and fMLLR speaker-adaptation techniques, and are used as input to the DBN. In this example, all DBNs use FSA features as input, with a context of 11 frames around the current frame. Following the setup in F. Seide, G. Li, and D. Yu, "Conversational Speech Transcription Using Context-Dependent Deep Neural Networks," in Proc. Interspeech, 2011, the architecture includes 6 hidden layers with 2,048 hidden units per layer and a seventh softmax layer with 9,300 output targets. As with the previous example, DBN results are reported for cross-entropy training only, to demonstrate the parameter reduction with low-rank.

Table 5 shows the WER and number of parameters for both the baseline and low-rank DBNs.

TABLE 5

| Method | WER | # of Params (% Reduction) |
|---|---|---|
| Baseline DBN | 14.2 | 41M |
| Low-Rank DBN (r = 512) | 14.4 | 28M (32%) |

For SWB, it was determined that the best performance corresponded to a rank of 512, compared to 128 for the BN tasks. As can be seen in Table 5, parameters are reduced by 32% with very little loss in accuracy.

Experimental Example 4

Embodiments of the present invention can also be applied to use low-rank factorization for DBNs in Language Modeling (DBN-LM) using the set-up given in E. Arisoy, T. N. Sainath, B. Kingsbury, and B. Ramabhadran, "Deep neural network language models," in Proceedings of the NAACL-HLT 2012 Workshop. June 2012, pp. 20-28, Association for Computational Linguistics. The term "DBN-LM" has been used to be consistent with acoustic modeling. However, generative pre-training was not used while training the language models.

Embodiments of the present invention apply low-rank factorization to the best scoring DBN architecture in E. Arisoy, et al. (see id.), which includes one projection layer where each word is represented with 120 dimensional features, three hidden layers with 500 hidden units per layer and a softmax layer with 10,000 output targets.

DBN language models are explored on a Wall Street Journal (WSJ) task (see Stanley F. Chen, "Performance prediction for exponential language models," Tech. Rep. RC24671, IBM Research Division, 2008). The language model training data includes 900,000 sentences (23.5 million words). Development and evaluation sets include 977 utterances (18,000 words) and 2,439 utterances (47,000 words) respectively. Acoustic models are trained on 50 hours of Broadcast News. Baseline 4-gram language models trained on 23.5 million words result in 22.3% WER on the evaluation set. DBN language models are evaluated using lattice rescoring. The performance of each model is evaluated using the model by itself and by interpolating the model with the baseline 4-gram language model. Interpolation weights are chosen to minimize the WER on the development set. The baseline DBN language model yields 20.8% WER by itself and 20.5% after interpolating with the baseline 4-gram language model.

In the low-rank Experimental Example 4, the final layer matrix of size 500×10,000 was replaced with two matrices, one of size 500×r and one of size r×10,000. Table 6 shows both the perplexity and WER on the evaluation set for different choices of the rank r and percentage reduction in parameters compared to the baseline DBN system. Perplexity can be defined as follows: When predicting a choice between K symbols (e.g., K words) with a probabilistic model, perplexity is a measure of how many effective choices on average are there after the model is applied on a given test set. It is the geometric average of the probability of the words in a test set.

TABLE 6

| | WER | | Perplexity | | |
|---|---|---|---|---|---|
| r = Rank | DBN LM | DBN LM + 4-gram LM | DBN LM | DBN LM + 4-gram LM | Params (% Reduction) |
| Baseline | 20.8 | 20.5 | 102.8 | 92.6 | 8.2M |
| 256 | 20.9 | 20.5 | 101.8 | 92.0 | 5.8M (29%) |
| 128 | 21.0 | 20.4 | 102.8 | 91.9 | 4.5M (45%) |

Table 6 shows that with a rank=128 in the interpolated model, almost the same WER and perplexity as the baseline system can be achieved, with a 45% reduction in the number of parameters.

Figure 4A:
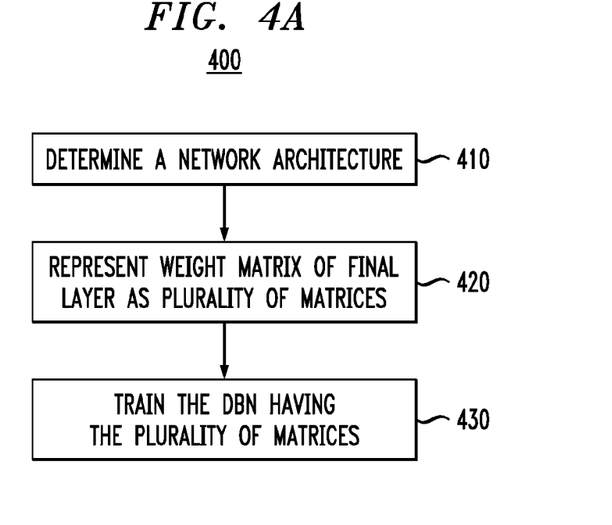
FIG. 4A is a flow diagram of a method for reducing the number of parameters of a DBN using a low-rank matrix factorization according to an exemplary embodiment of the present invention.

Referring to FIG. 4A, a method for reducing the number of parameters of a DBN using a low-rank matrix factorization 400 according to an exemplary embodiment of the present invention comprises determining a network architecture including a plurality of layers (Step 410), such as, for example, the network architecture shown in FIG. 1, using matrix factorization to represent a weight matrix of a final layer of the plurality of layers as a plurality of matrices (Step 420), and training the DBN having the plurality of matrices (Step 430).

As discussed above, the final layer weight matrix has a size of m×n, and the plurality of matrices includes a first matrix of size m×r and a second matrix of size r×n, wherein r is a rank having a value that reduces the number of training parameters of the DBN.

Figure 4B:
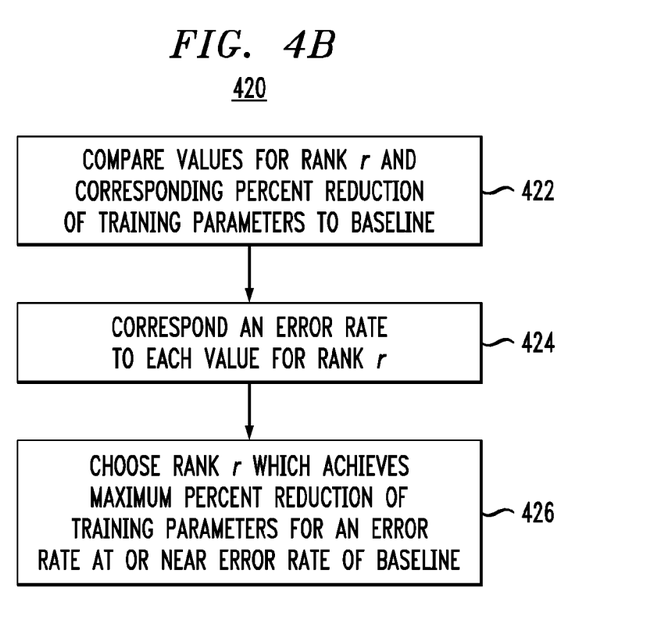
FIG. 4B is a flow diagram of a method for representing a weight matrix of a final layer as a plurality of matrices in a method of reducing the number of parameters of a DBN using a low-rank matrix factorization according to an exemplary embodiment of the present invention.

Referring to FIG. 4B, a method for representing a weight matrix of a final layer as a plurality of matrices according to an exemplary embodiment of the present invention comprises comparing a plurality of values for the rank r and a corresponding percent reduction of the number of training parameters for each value for the rank r to a baseline architecture (Step 422). This type of comparison is, for example, illustrated in Table 1. As discussed above, the baseline architecture is based on the full-rank, using the unfactored final weight matrix having the size of m×n. Referring to FIG. 4B and Table 1, to method includes corresponding an error rate (e.g., WER) to each value for the rank r, and choosing the value of the rank r from the plurality of values which achieves a maximum percent reduction of the number of training parameters with respect to the baseline architecture for an error rate at or near an error rate of the baseline architecture (Step 426). For example, in the case of Table 1, the rank r of 128 achieves a maximum percent reduction for an error rate that is the same as the baseline error rate.

As discussed above, the chosen value of the rank r can be confirmed by determining how many of a total number of output targets of the baseline architecture are above a threshold to be termed active.

Also as discussed above, according to an embodiment, matrix factorization may be used to represent as a plurality of matrices a weight matrix of a non-final layer of the plurality of layers, and an error rate and a percent reduction of the number of training parameters of the DBN for an architecture including the factored non-final layer can be compared to a baseline architecture including the factored final layer weight matrix.

Figure 5:
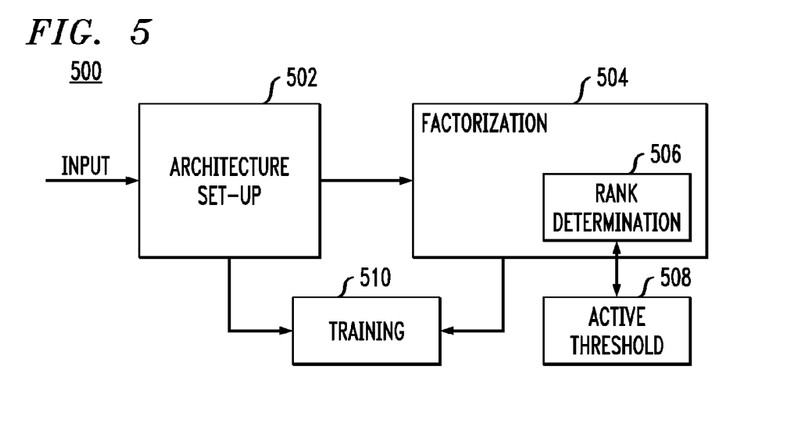
FIG. 5 is a high-level diagram of a system for reducing the number of parameters of a DBN using a low-rank matrix factorization according to an exemplary embodiment of the invention.

Referring to FIG. 5 a system for reducing the number of parameters of a DBN using a low-rank matrix factorization 500 according to an exemplary embodiment of the invention comprises an architecture setup module 502 capable of determining a network architecture, a factorization module 504 capable of using matrix factorization to represent a weight matrix of a final layer of the plurality of layers as a plurality of matrices, and a training module 510 capable of training the DBN having the plurality of matrices.

The factorization module 504 includes a rank determination module 506 capable of comparing a plurality of values for the rank r and a corresponding percent reduction of the number of training parameters for each value for the rank r to a baseline architecture as shown, for example, in Table 1. The rank determination module 506 is further capable of corresponding an error rate to each value for the rank r, and choosing a value of the rank r from the plurality of values which achieves a maximum percent reduction of the number of training parameters with respect to the baseline architecture for an error rate at or near an error rate of the baseline architecture.

In accordance with an embodiment, the system 500 can include an active threshold module 508 capable of confirming the chosen value of the rank r by determining how many of a total number of output targets of the baseline architecture are above a threshold to be termed active.

The factorization module 504 may be further capable of using matrix factorization to represent as a plurality of matrices a weight matrix of a non-final layer of the plurality of layers, and the rank determination module 506 capable of comparing an error rate and a percent reduction of the number of training parameters of the DBN for an architecture including the factored non-final layer to a baseline architecture.

In general, embodiments of the present invention apply a low-rank matrix factorization of the final weight layer in a DBN. Experimental results using this factorization for acoustic modeling on three different LVCSR tasks, including 50 and 400 hr English Broadcast News tasks and a 300 hr Switchboard telephony tasks revealed that the low-rank matrix factorization allowed a reduction of the number of parameters of the network between 30-50%, resulting in approximately a 30-50% speedup in training time, with little loss in final recognition accuracy compared to a full rank representation. Embodiments of the present invention also apply the low-rank factorization to language modeling, and experimental results demonstrated improvements in training speed with no loss in final WER.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-5 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 6:
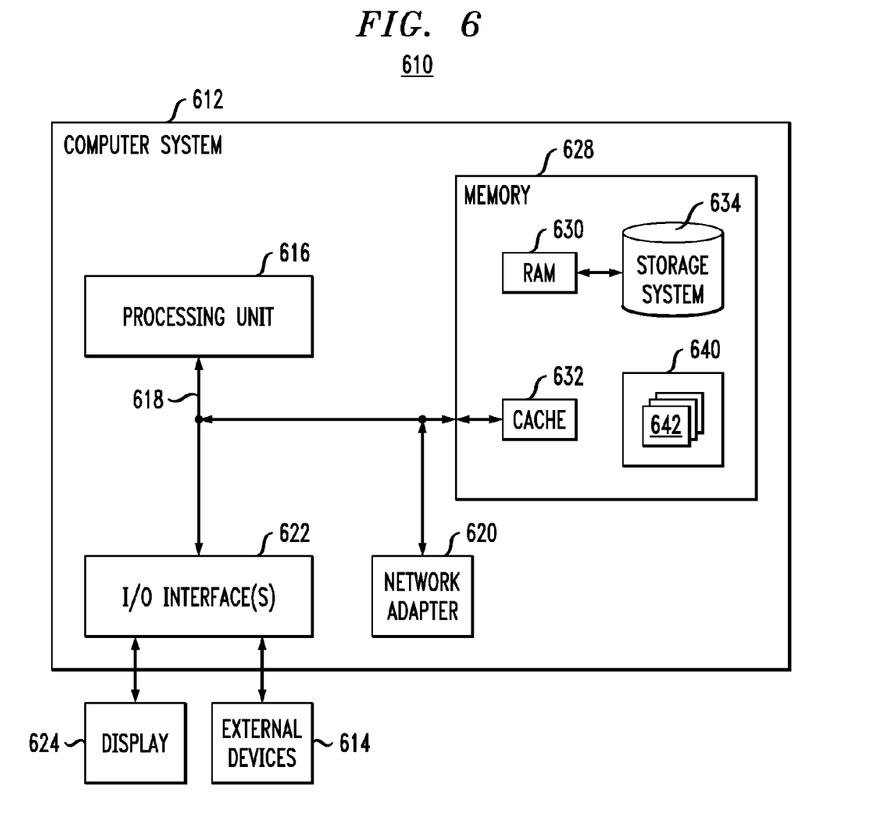
FIG. 6 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for reducing a number of training parameters in a deep belief network (DBN), comprising:
   a memory and at least one processor operatively coupled to the memory;
   an architecture setup module executed via the at least one processor, and capable of determining a network architecture including a plurality of layers;
   a factorization module operatively coupled to the architecture setup module and executed via the at least one processor, and capable of using matrix factorization to represent a weight matrix of a final layer of the plurality of layers as a plurality of matrices; and
   a training module operatively coupled to the factorization module and executed via the at least one processor, and capable of training the DBN having the plurality of matrices.

2. The system according to claim 1, wherein the final layer weight matrix has a size of m×n, and the plurality of matrices includes a first matrix of size m×r and a second matrix of size r×n, wherein r is a rank having a value that reduces the number of training parameters of the DBN.

3. The system according to claim 2, further comprising a rank determination module capable of comparing a plurality of values for the rank r and a corresponding percent reduction of the number of training parameters for each value for the rank r to a baseline architecture.

4. The system according to claim 3, wherein the baseline architecture uses an unfactored final weight matrix having the size of m×n.

5. The system according to claim 3, wherein the rank determination module is further capable of corresponding an error rate to each value for the rank r.

6. The system according to claim 5, wherein the rank determination module is further capable of choosing a value of the rank r from the plurality of values which achieves a maximum percent reduction of the number of training parameters with respect to the baseline architecture for an error rate at or near an error rate of the baseline architecture.

7. The system according to claim 6, further comprising an active threshold module capable of confirming the chosen value of the rank r by determining how many of a total number of output targets of the baseline architecture are above a threshold to be termed active.

8. The system according to claim 1, wherein the factorization module is further capable of using matrix factorization to represent as a plurality of matrices a weight matrix of a non-final layer of the plurality of layers.

9. The system according to claim 8, further comprising a rank determination module capable of comparing an error rate and a percent reduction of the number of training parameters of the DBN for an architecture including the factored non-final layer to a baseline architecture.

10. An article of manufacture comprising a computer readable storage medium comprising program code tangibly embodied thereon, which when executed by a computer, performs method steps for reducing a number of training parameters in a deep belief network (DBN), the method steps comprising:
    determining a network architecture including a plurality of layers;
    using matrix factorization to represent a weight matrix of a final layer of the plurality of layers as a plurality of matrices; and
    training the DBN having the plurality of matrices.

11. A method for reducing a number of training parameters in a deep belief network (DBN), the method comprising:
    determining a network architecture including a plurality of layers;
    using matrix factorization to represent a weight matrix of a final layer of the plurality of layers as a plurality of matrices; and
    training the DBN having the plurality of matrices.

12. The method according to claim 11, wherein the final layer weight matrix has a size of m×n, and the plurality of matrices includes a first matrix of size m×r and a second matrix of size r×n, wherein r is a rank having a value that reduces the number of training parameters of the DBN.

13. The method according to claim 12, further comprising comparing a plurality of values for the rank r and a corresponding percent reduction of the number of training parameters for each value for the rank r to a baseline architecture.

14. The method according to claim 13, wherein the baseline architecture uses an unfactored final weight matrix having the size of m×n.

15. The method according to claim 13, further comprising corresponding an error rate to each value for the rank r.

16. The method according to claim 15, further comprising choosing a value of the rank r from the plurality of values which achieves a maximum percent reduction of the number of training parameters with respect to the baseline architecture for an error rate at or near an error rate of the baseline architecture.

17. The method according to claim 16, further comprising confirming the chosen value of the rank r by determining how many of a total number of output targets of the baseline architecture are above a threshold to be termed active.

18. The method according to claim 11, further comprising using matrix factorization to represent as a plurality of matrices a weight matrix of a non-final layer of the plurality of layers.

19. The method according to claim 18, further comprising comparing an error rate and a percent reduction of the number of training parameters of the DBN for an architecture including the factored non-final layer to a baseline architecture.

20. The method according to claim 19, wherein the baseline architecture includes the factored final layer weight matrix.

\* \* \* \* \*